July 11, 1961
HIROSHI ITO
2,991,682
VARIABLE POWER VIEW AND RANGE FINDER
Filed Aug. 7, 1957
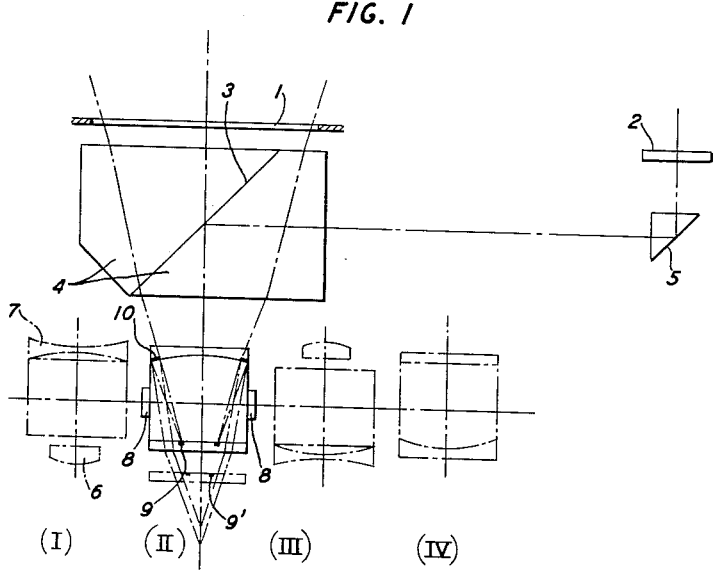
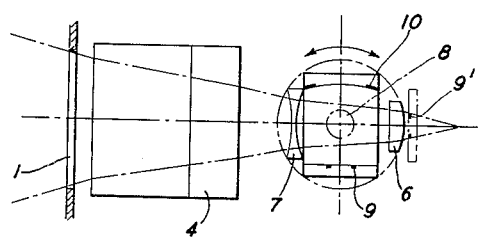
INVENTOR
HIROSHI ITO
BY
ATTORNEY

United States Patent Office 2,991,682
Patented July 11, 1961

2,991,682
VARIABLE POWER VIEW AND RANGE FINDER
Hiroshi Ito, Tokyo, Japan, assignor to Canon Camera Company, Inc., Tokyo, Japan, a corporation of Japan
Filed Aug. 7, 1957, Ser. No. 676,748
Claims priority, application Japan Nov. 13, 1956
1 Claim. (Cl. 88—1.5)

This invention relates to a variable power view and range finder.

It is an object of the present invention to provide a combined view and range finder with variable power of amazingly accurate performance.

A clearer concept of the scope and purpose of the present invention may be obtained from the following description, taken in connection with the attached drawing, in which:

FIG. 1 is a plan view of a variable power view and range finder according to the present invention, and FIG. 2 is a side view.

Referring to the drawing, 1 is an aperture for the main optical path of the view and range finder. The range finder aperture is designated at 2, while 3 is a semi-transparent mirror, positioned at 45° diagonally in each the main optical and the range finder optical path superimposing the beams upon each other and merging them, and prisms 4 are cemented to each other on the diagonal faces thereof between which the semi-transparent mirror 3 is supported. 5 is the total reflection prism for deflecting light from the range finder aperture 2 to the semi-transparent mirror 3. A Galilean telescope optical system comprising a convex lens 6 and a concave lens 7 is interchangeably disposed rotatably on a support shaft 8 beyond the semi-transparent mirror 3 in the main optical path. Also supported on the shaft 8 and at right angles to the Galilean telescope optical system a concave mirror reflex finder, that is, an optical system sometimes termed an Albada finder, comprising a bright frame 9 and a framed concave full reflecting mirror or concave semi-transparent reflector 10, is provided whereby the Galilean telescope optical system and the Albada finder optical system may be interchanged on rotation of shaft 8. The magnification of the Albada finder optical system is selected to lie between the magnification of the Galilean telescope optical system in the latter's normal and inverse direction, which in its normal position has unit magnification. Bright frame 9 may be detached, as an exception, from the interchangeable member and held in inactive position at any time in the rearmost portion of the main optical path as shown in FIG. 1 (II), and in the chain line 9' of FIG. 2.

In the variable power view and range finder according to the present invention, when the rotatable shaft is positioned so that the Galilean telescope optical system in its inverse position in the optical path as shown in FIG. 1 (I), the image field of the combined view and range finder represents an image of reduced magnification but of wide angle with aperture 1 functioning as a field mask; in other words, the field for a wide angle camera objective. When the Albada finder optical system is positioned in the main optical path as shown in FIG. 1 (II), the light rays reflected from bright frame 9 again reflect on framed or concave semi-transparent reflector 10 thereby to superimpose an image of bright frame 9 in the frontal field, thus representing the field for an interchangeable camera objective of a relatively narrow angle, by an image magnified somewhat more than the image obtained when using the above mentioned inverse Galilean telescope optical system. When the shaft is rotated to position in the main optical path the normal Galilean telescope system, as shown in FIG. 1 (III), a narrow field is represented by the increased magnifying power, the reciprocal of the power of the inverse Galilean telescope optical system and the image of the range finder is obtained at the maximum magnifying power as compared with the aforesaid two cases, so that the highest degree of precision is attained for range finding. It should be noted that the Albada finder optical system may alternatively be appliable in the inverse direction as shown in FIG. 1 (IV), in which bright frame 9 and the framed or concave semi-transparent reflector 10 do not present themselves in the image area thereby being devoid of collimating action to produce a relatively wide field with objective aperture 1 as a field mask. Support axle 8 may be disposed either horizontally or vertically. When a finder having a horizontally long oblong field of view is used, support axle 8 may be preferably rotated on a horizontal axis as shown in FIG. 1 with the resultant advantage in a more efficient structure of a relatively small size for the objective system of the interchangeable member.

The use of a rotatable Galilean telescope in the light path of a combined range and view finder beyond a semi-transparent mirror diagonally positioned at the intersection of the light beams from the viewer window and the range window, is prior known. This kind of arrangement, however, has the inevitable disadvantage in the resultant inaccurate border line of the image field with increasing power of magnification so that it is not adaptable for providing a view finder of a high precision. It suffers from the defect of inaccuracy as does the case of the normal built-in Galilean telescope to increase the magnifying power, and as does the case of a plain system for unit magnification. To overcome these difficulties the present invention provides an Albada finder optical system instead of a mere plain system between the normal and inverse Galilean telescope optical systems as a combined set so that an accurate and clear-cut image field is produced by its inherent property to a remarkable improvement over the above mentioned device. Moreover, this kind of arrangement has the further advantage that when the normal Galilean telescope optical system to increase the magnifying power is applied solely for a high precision range finding, the overall function of each system yields an unexceptional efficiency for a variable power view and range finder.

What is claimed is:

A variable magnification means in the combined light path of a combined view and range finder, comprising a rotatable turret, a convex lens and a first concave lens positioned diametrically opposite each other on the turret, a flat lens and a second concave lens positioned diametrically opposite each other on the turret on a diameter substantially perpendicular to that on which the convex lens and the first concave lens are positioned, a reflecting semi-transparent mirror on the peripheral regions of the surface of the second concave lens facing the flat lens, and a bright frame on the flat lens, the flat lens and the second concave lens together with the reflecting mirror and the bright frame constituting an Albada finder, the magnification power of the optical system defined by the second concave lens and the flat lens lying between the magnification of the optical system defined by the convex lens and the first concave lens in its normal position and that in its inverse position, and the flat lens being selectively movable to a greater distance from the reflecting mirror to render the bright frame inactive.

References Cited in the file of this patent
UNITED STATES PATENTS

| | | |
|---|---|---|
| 2,552,940 | Cornut | May 15, 1951 |
| 2,780,129 | Wood | Feb. 5, 1957 |
| 2,896,500 | Kakunodate | July 28, 1959 |

FOREIGN PATENTS

| | | |
|---|---|---|
| 996,990 | France | Sept. 5, 1951 |